Figure 1:
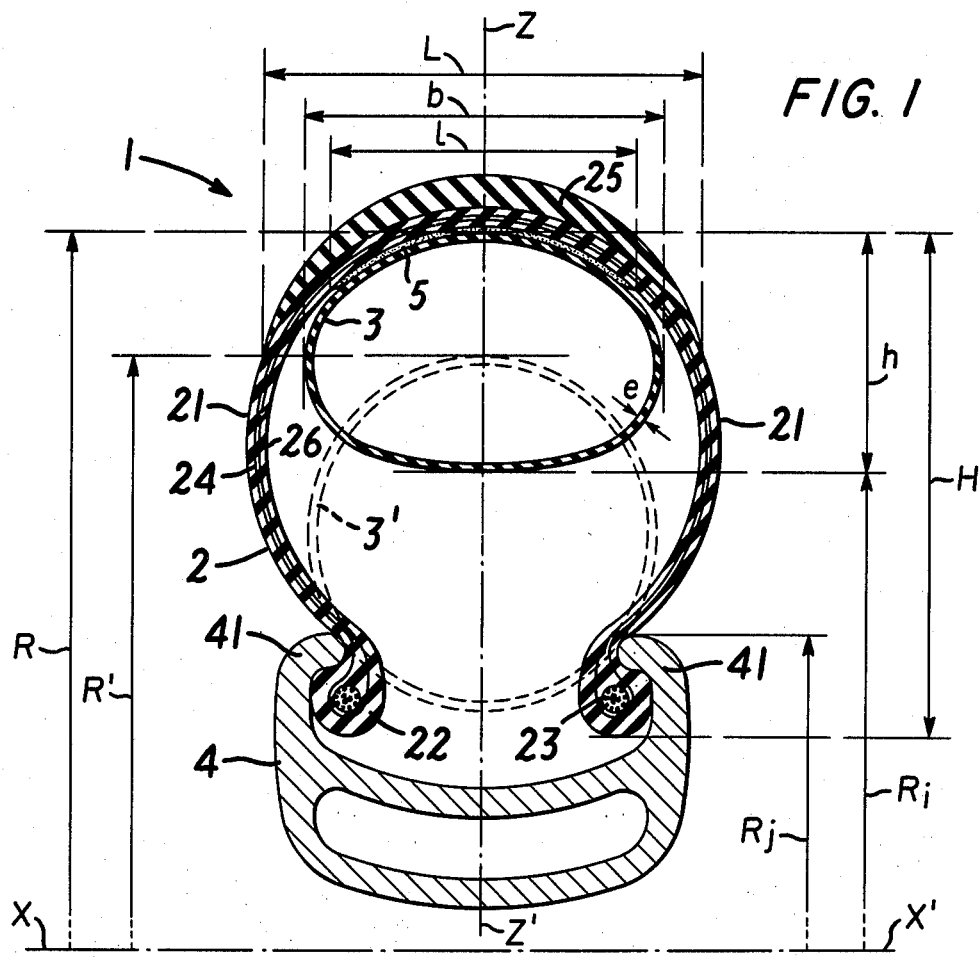

United States Patent [19]

Dubois

[11] 4,293,018
[45] Oct. 6, 1981

[54] TIRE FOR TWO-WHEEL VEHICLE
[75] Inventor: Gerard Dubois, Sayat, France
[73] Assignee: Compagnie Generale des Etablissements Michelin, Clermont-Ferrand, France
[21] Appl. No.: 138,339
[22] Filed: Apr. 8, 1980
[30] Foreign Application Priority Data
  Apr. 9, 1979 [FR] France ............................ 79 09122
[51] Int. Cl.³ .................. B60C 5/04; B60C 15/04; B60C 21/08
[52] U.S. Cl. .............................. 152/347; 152/349; 152/351; 152/362 R; 156/118
[58] Field of Search ............................ 152/346–348, 152/349–350, 351, 362 R, DIG. 16; 156/110 R, 115, 118, 121

[56] References Cited

U.S. PATENT DOCUMENTS

| | | | |
|---|---|---|---|
| 811,109 | 1/1906 | Veith | 152/349 |
| 1,496,114 | 6/1924 | Bonner | 152/351 |
| 1,527,863 | 2/1925 | Goble | 152/348 |
| 3,935,893 | 2/1976 | Stang et al. | 152/347 |

FOREIGN PATENT DOCUMENTS

| | | | |
|---|---|---|---|
| 102546 | 12/1916 | United Kingdom | 152/349 |
| 128692 | 7/1919 | United Kingdom | 152/349 |

Primary Examiner—Edward C. Kimlin
Assistant Examiner—Lois E. Boland
Attorney, Agent, or Firm—Brumbaugh, Graves, Donohue & Raymond

[57] ABSTRACT

A tire for two-wheel vehicle comprising a casing formed of a crown with a tread and two sidewalls each terminating in a bead intended to rest on a tire rim and an inner tube glued in manually removable manner to the inner wall of the casing in the region of the crown is improved due to the fact that the inner tube is glued under circumferential tension to the casing so that its inside equatorial radius is greater than the outside radius of the flanges of the rim. The adhesive used may have self-sealing properties.

5 Claims, 2 Drawing Figures

TIRE FOR TWO-WHEEL VEHICLE

The present invention relates to tires for two-wheel vehicles and in particular to tires for bicycles consisting of a casing and an inflatable inner tube.

Upon the mounting of the inner tube and the casing on the tire rim, it frequently happens that a part of the inner tube is pinched either temporarily between a mounting lever and a bead of the casing or permanently between a bead of the casing and the tire rim.

Due to the trend towards thinning the walls of the inner tubes and decreasing the cross section of tires of the type in question, such pinching frequently injures the wall of the inner tube, leading either to a blow-out of the inner tube or to a progressive loss of the inflation pressure.

In order to avoid pinching the inner tube, it has been proposed (U.S. Pat. No. 811,109) to manufacture inner tubes whose cross section has the shape of a crescent which adapts itself against the inside of the crown of the casing. It has also been proposed (U.S. Pat. No. 1,527,863) to manufacture inner tubes whose cross section has the shape of a mushroom the head of which fits against the inside of the crown of the casing. When, after the mounting of the casing and of the inner tube, inflation is effected, the inner tube assumes a circular cross section. Furthermore, the above-indicated means are combined with an outside diameter of the uninflated inner tube which is greater than the inside diameter of the casing, the two diameters being measured in the plane of the equator. Thus, the uninflated inner tube has a tendency to apply itself against the inside of the crown of the casing. It has also been proposed to glue the inner tube in removable manner along an equatorial zone inside of the crown of the casing (U.S. Pat. No. 1,496,114).

Such inner tubes are complicated to manufacture and at times require additional local reinforcements, in particular for the portion in contact with the inside of the crown of the casing (British Pat. No. 128,692) or glued to it (U.S. Pat. No. 1,496,114).

The object of the present invention is to provide a simple solution for overcoming the pinching of the inner tubes of bicycle tires while decreasing the time required for mounting and repair and employing an ordinary inner tube.

Thus, the tire for two-wheel vehicles in accordance with the present invention which comprises a casing formed of a crown with a tread and two sidewalls each terminating in a bead intended to rest on a tire rim and an inner tube glued in manually removable manner to the inner wall of the casing in the region of the crown, is characterized by the fact that, in uninflated state, the glued inner tube has a wall of constant thickness and is glued under circumferential tension to the casing so that the inside equatorial radius of the glued inner tube is greater than the outside radius of the flanges of the rim and so that the cross section of the glued inner tube has an oval contour whose equatorial radial height is less than both the maximum axial width of said contour and the average diameter of said contour. The average diameter is equal to the quotient of the circumferential length of said contour divided by the number $\pi$.

A suitable equatorial extension ratio of the glued inner tube, that is to say the ratio of the difference between the outside equatorial radius of the glued inner tube and the outside equatorial radius of the uninflated and nonglued inner tube, i.e., the inner tube as manufactured, to the outside equatorial radius of the uninflated and nonglued inner tube is advantageously between 0.5% and 5%, and preferably between 1.5% and 3%, of the outside equatorial radius of the uninflated and nonglued inner tube. The equatorial extension ratio is preferably equal to the ratio, expressed in percentage, of the difference between the outside equatorial radius of the glued inner tube and the outside equatorial radius of the inner tube by itself, that is to say in the absence of the casing, inflated to 0.05 bar and resting with very slight tension—that is to say without apparent deformation of its circular section—against the flanges of the tire rim, to the outside equatorial radius of the inner tube by itself.

A preferred variant employs an adhesive which also has self-sealing properties to punctures in place of the non-permanent adhesive. Thus, the self-sealing non-permanent adhesive, which assures the gluing of the inner tube along an equatorial zone (that is to say, a zone centered on the equator) having, for instance, an axial width approximately equal to the axial width of the tread of the casing, automatically seals off punctures. In this way, one avoids excessively frequent removals and remountings of the tire.

Another preferred variant contemplates—in combination or not with the preceding one—providing the casing with flexible beads, that is to say beads which are not each reinforced by a rigid bead ring, for instance a steel wire, but rather by a flexible bead ring formed of thin steel wires, glass fibers, or synthetic or natural textile material (polyamides, polyesters, etc.). As a result, the tire formed of the casing and the inner tube, which are arranged in accordance with the present invention, becomes a tire which can be folded or rolled on itself. If one is careful to open the inflation valve of the inner tube before folding or rolling the tire, it is noted, in unexpected manner, when unfolding or unrolling the tire that the inner tube has no longer retained its circular section. The inner tube, seen in cross section, has flattened itself against the inner wall of the casing in the region of the crown while remaining glued against it along the equatorial zone, and the cross section of the inner tube has assumed the shape of a crescent.

This crescent-shaped flattening of the inner tube against the inner wall of the casing in the region of the crown considerably facilitates the mounting of the tire on the tire rim and contributes, in unexpected manner, towards minimizing the risk of the pinching of the inner tube. When, the tire being mounted, the inner tube is inflated, the latter assumes its customary cross section and position.

Figure 2:
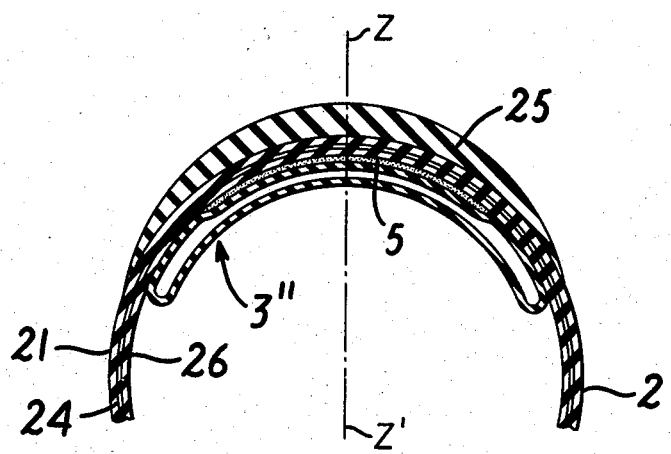

One illustrative embodiment of the present invention is described in detail below with reference to the drawing, in which:

FIG. 1 is a view in radial cross section through a tire according to the present invention, mounted on a rim, and FIG. 2 is a partial view, also in radial cross section, of the part of the tire comprising the glued inner tube, in the position in which it is when it contains practically no air.

The elastomer tire 1 shown in FIG. 1 is composed essentially of an outer casing 2 and an inner tube 3 whose wall has a substantially constant thickness e. This inner tube 3 is provided, as customary, with an inflation valve (not shown).

The casing 2 has two sidewalls 21 each of which is terminated by a bead 22 reinforced by a bead ring 23. The entire casing 2 is reinforced by a fabric reinforcement 24 which extends from one bead ring 23 to the other. In order to travel on the ground, the casing 2 is protected at its crown by a cap or tread 25 which is centered on the equatorial plane of the tire 1; the trace of this plane on the drawing is indicated by the line ZZ'.

The combination of the casing 2 with its inner tube 3 is shown mounted on a tire rim 4 in known manner. The line XX' represents the axis of the tire 1 and rim 4.

When the inner tube 3 has not yet been glued to the casing 2 and is inflated to a very low pressure, for instance to 0.05 bar, it has practically the circular shape shown by the dashed-line circles 3'; its outside equatorial radius R' is then definitely less than the outside equatorial radius R which it has when it is glued to the inner wall 26 of the casing 2 in the region of the crown covered by the cap or tread 25. This difference between the initial radius R' and the larger radius R determines the degree of circumferential tension of the inner tube 3 and imparts to it the oval contour shown in FIG. 1. This oval contour can be measured by the equatorial radial height h and the maximum axial width b of the cross section of the inner tube 3. This height h is definitely less than the equatorial height H of the casing 2, so that the lowest part of the inner tube 3 is well above the flanges 41 of the tire rim 4 and the levers (not shown) used for mounting the tire 1 on the rim 4 or removing it from the rim 4 while the inner tube 3 is uninflated do not present the danger of injuring the inner tube 3. The height h of the glued inner tube 3 is smaller the greater the difference $R-R'$ and the less air there is in the inner tube 3.

Furthermore, the equatorial radial height h of the oval contour of the glued inner tube 3 is less than both the maximum axial width b of that contour and the average diameter of that contour. The average diameter is equal to $C/\pi$, C designating the length of the circumference of the cross section of this inner tube 3.

In the region of the crown of the casing 2 located below the cap or tread 25, a layer of adhesive 5 holds the inner tube 3 attached to the inner wall 26 of the casing 2. This layer of adhesive 5 may be in a mixture having self-sealing properties, that is to say in case of a puncture of the casing 2 and of the inner tube 3 in this region of the tire 1, the gluing and self-sealing mixture 5 rapidly seals the puncture, thus limiting the loss of air from the tire 1.

As shown, the region of the layer of adhesive 5 is centered on the equator (trace ZZ') of the tire 1. Its axial width l is approximately equal to (in this case slightly less than) the axial width L of the cap or tread 25.

When the bead rings 23 of the beads 22 are flexible, it is possible, in accordance with another variant of the present invention, to fold or roll the tire 1 on itself so as to be able to store it in a very small space. This folding or rolling causes the evacuation—through the valve (not shown) which is maintained open—of the air contained within the inner tube 3. This inner tube 3, glued to the inner wall of the casing 2, then assumes a crescent-shaped cross section 3" (FIG. 2) which is closely flattened against the inner wall of the casing 2 in the region of the crown, which shape it retains when the tire is unfolded or unrolled and which moreover further minimizes the risk of the pinching of the inner tube 3 between the beads 22 and the rim 4.

After the mounting of the tire 1, the inner tube 3 is inflated to its normal pressure and the inner tube 3, as is customary, occupies practically the entire inner space available between the casing 2 and the rim 4.

In FIG. 1, $R_i$ designates the inside equatorial radius of the glued inner tube 3, and $R_j$ the outside radius of the flanges 41 of the rim 4. $R_i$ is greater than $R_j$.

As used herein, the term "uninflated" means that the inner tube has a very low inflation pressure, for example, an inflation pressure of 0.05 bar.

What is claimed is:

1. A tire for two-wheel vehicles comprising a casing formed of a crown with a tread and two sidewalls each terminating in a bead intended to rest on a tire rim and an inner tube glued in manually removable manner to the inner wall of the casing in the region of the crown, said tire being characterized by the fact that, in uninflated state, the glued inner tube has a wall of constant thickness and is glued under circumferential tension to the casing so that the inside equatorial radius of the glued inner tube is greater than the outside radius of the flanges of the rim and so that the cross section of the glued inner tube has an oval contour whose equatorial radial height is less than both the maximum axial width of said contour and the average diameter of said contour.

2. The tire according to claim 1, characterized by the fact that the ratio of the difference between the outside equatorial radius of the glued inner tube and the outside equatorial radius of the uninflated and nonglued inner tube, to the latter radius, is between 0.5% and 5%, and preferably between 1.5% and 3%, of the outside equatorial radius of the uninflated and nonglued inner tube.

3. The tire according to claim 1 or claim 2, characterized by the fact that the inner tube is glued by means of an adhesive which has self-sealing properties to punctures.

4. The tire according to claim 1 or claim 2, characterized by the fact that the inner tube is glued along an equatorial zone, the axial width of which is approximately equal to the axial width of the tread of the casing.

5. The tire according to claim 1 or claim 2, characterized by the fact that the beads of the casing are flexible and make it possible to roll the tire on itself causing evacuation of air contained within the inner tube, and by the fact that the inner tube, after the unrolling of the tire, has a flattened crescent shape applied against the inner wall of the casing in the region of the crown.

* * * * *